(12) United States Patent
Kreiner et al.

(10) Patent No.: US 9,762,736 B2
(45) Date of Patent: *Sep. 12, 2017

(54) AUDIO PROCESSING FOR MULTI-PARTICIPANT COMMUNICATION SYSTEMS

(71) Applicant: AT&T Intellectual Property I, L.P., Atlanta, GA (US)

(72) Inventors: Barrett Kreiner, Woodstock, GA (US); Jonathan Reeves, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/150,904

(22) Filed: May 10, 2016

(65) Prior Publication Data

US 2016/0255203 A1 Sep. 1, 2016

Related U.S. Application Data

(63) Continuation of application No. 11/968,096, filed on Dec. 31, 2007.

(51) Int. Cl.
*H04M 3/42* (2006.01)
*H04M 3/56* (2006.01)
*H04M 3/22* (2006.01)
*G06F 3/16* (2006.01)
(Continued)

(52) U.S. Cl.
CPC ............ *H04M 3/568* (2013.01); *G06F 3/162* (2013.01); *G06F 3/165* (2013.01);
(Continued)

(58) Field of Classification Search
CPC .. H04M 7/125; H04M 7/006; H04M 2201/40; H04M 2203/2027; H04M 2203/2066; H04M 3/002; H04M 3/2209; H04M 11/062; H04M 3/568; H04M 3/2227; H04M 9/082; H04M 2201/18;
(Continued)

(56) References Cited

U.S. PATENT DOCUMENTS

5,991,385 A 11/1999 Dunn et al.
2003/0185369 A1 10/2003 Oliver et al.
(Continued)

*Primary Examiner* — Md S Elahee
*Assistant Examiner* — Kharye Pope
(74) *Attorney, Agent, or Firm* — Garlick & Markison; Bruce E. Stuckman (57) ABSTRACT

Audio processing is provided to determine whether an audio issue is present within a multi-participant communication system such as a teleconference or videoconference bridge or a trunk dispatch system. Audio issues such as background noise, background conversations, or other unwanted audio that is being interjected into the multi-participant conversation and that may be dominating the audio are detected by measuring characteristics of audio samples taken from the communication ports of the multi-participant communication system. A correction may then be applied to the audio received through the communication port by a processor of the multi-participant communication system without intervention by an administrator, such as by muting the port, applying a noise cancellation to audio from the port, or time-shifting the audio from the port.

20 Claims, 4 Drawing Sheets

(51) Int. Cl.
*G10L 21/0232* (2013.01)
*G10L 21/0364* (2013.01)
*H04M 9/08* (2006.01)
*H04L 5/14* (2006.01)

(52) U.S. Cl.
CPC ...... *G10L 21/0232* (2013.01); *G10L 21/0364* (2013.01); *H04M 3/2227* (2013.01); *H04M 3/56* (2013.01); *H04M 2203/352* (2013.01)

(58) Field of Classification Search
CPC ......... H04M 7/123; H04B 3/23; H04B 3/234; H04B 3/32; H04B 1/0475; H04B 1/123; G10L 25/90; G10L 19/265; G10L 21/0232; G10L 21/0364; G10L 15/02; G10L 15/10; G10L 21/02; G10L 21/0272
USPC ............ 379/406.01, 202.01, 406.06, 406.08; 370/352; 455/296, 63.1; 704/500, 226, 704/E15.015, E21.002
See application file for complete search history.

(56) References Cited

U.S. PATENT DOCUMENTS

| | | |
|---|---|---|
| 2003/0187655 A1* | 10/2003 | Dunsmuir ......... H04M 3/53333 704/270 |
| 2005/0185602 A1 | 8/2005 | Simard et al. |
| 2005/0213739 A1 | 9/2005 | Rodman et al. |
| 2005/0254440 A1 | 11/2005 | Sorrell |
| 2006/0126538 A1 | 6/2006 | Krstulich |
| 2006/0239443 A1 | 10/2006 | Oxford et al. |
| 2007/0058795 A1 | 3/2007 | Arrant et al. |
| 2007/0104121 A1 | 5/2007 | Shaffer et al. |
| 2007/0111743 A1 | 5/2007 | Leigh et al. |
| 2007/0280195 A1 | 12/2007 | Shaffer et al. |
| 2008/0031437 A1 | 2/2008 | Rey |
| 2009/0086949 A1 | 4/2009 | Caspi et al. |
| 2009/0125295 A1 | 5/2009 | Drewes |
| 2010/0135478 A1 | 6/2010 | Wald et al. |

* cited by examiner

AUDIO PROCESSING FOR MULTI-PARTICIPANT COMMUNICATION SYSTEMS

CROSS-REFERENCE TO RELATED APPLICATIONS

The present U.S. Utility patent application claims priority pursuant to 35 U.S.C. §120 as a continuation of U.S. Utility application Ser. No. 11/968,096, entitled "AUDIO PROCESSING FOR MULTI-PARTICIPANT COMMUNICATION SYSTEMS", filed Dec. 31, 2007, which is hereby incorporated herein by reference in its entirety and made part of the present U.S. Utility patent application for all purposes.

TECHNICAL FIELD

Embodiments relate to multi-participant communication systems such as conference bridges and dispatch trunks. More particularly, embodiments relate to audio processing occurring within the multi-participant communication systems.

BACKGROUND

Multi-participant communication systems allow several participants in widespread locations to participate within a conversation, meeting, or other setting. For example, a conference bridge such as for teleconferencing or video conferencing allows participants located anywhere that phone or data service is available to dial into the teleconference or video conference bridge and participate within the discussion involving multiple other participants. As another example, dispatch trunks allow widespread groups of individuals, each of whom may be mobilized, to send and receive communications among the group.

While such multi-participant communication systems provide a very valuable service to the participants, there are drawbacks due to the manner in which individuals are permitted to contribute to the discussion. With the teleconference and video conference bridge examples, in some instances several if not all participants may have an open microphone so that the several participants may interject speech into the discussion at any time. This open microphone ensures that each participant has the ability to contribute as he or she wishes. However, the teleconference or videoconference bridge may combine the audio being received from all conference ports assigned to the participants such that background noise and side conversations from each participant location may be included in the audio being provided to all participants. These background noises and side conversations may begin to dominate the conference. Furthermore, in some conference bridges, audio for the bridge may be received from only a dominant port at any given time, and the port producing the background noise may be selected as the dominant port, thereby excluding legitimate audio from other ports corresponding to other participants.

This problem has been addressed in a couple of ways. One conventional way to address this problem is by providing the participant with the option to mute the microphone at his or her location. Of course, the participant must be aware that muting of the microphone is necessary, and it is often the case that the participant who is responsible for the background noise or side conversations is unaware that this unwanted audio is being interjected into the conference from his or her location. Furthermore, the participant must have the initiative to operate the mute function. Another conventional way to address this problem is by providing an administrator of the conference with an interface whereby the administrator can choose to mute a given port of the conference. The administrator either has to guess which port to mute, or in some conference bridges, the interface suggests which port is producing the unwanted audio to the administrator.

The dispatch trunk has similar issues regarding background noise and side conversations. Like some conference bridges, a trunk may limit the audio to a single highest priority port at any given time, thereby exacerbating the problem if the background noise becomes the highest priority port. Thus, the background noise or side conversations of one participant may serve to hinder or even altogether exclude other participants from interjecting legitimate speech onto the trunk. Considering that emergency services personnel rely on dispatch trunks to convey time-critical emergency information, the issue becomes even more significant.

SUMMARY

Embodiments address issues such as these and others by providing audio processing at the conference bridge or dispatch trunk to decrease the likelihood that background noise or side conversations interfere or dominate the discussion. For example, background noise or side conversations may be detectable through signal processing and pattern matching. When such unwanted audio is detected, a correction may be applied to the audio port responsible for the unwanted audio. The correction may be to mute the audio port altogether, to filter out unwanted audio patterns, such as a particular background noise or side conversation level, or even to time shift audio from a given port if it would otherwise overlap with audio from another port.

Embodiments provide a conference bridge that includes a plurality of conference bridge ports through which audio is delivered to and received from conference participants. The audio from each conference bridge port is shared with the other conference bridge ports of the plurality. A processor is in communication with the plurality of conference bridge ports and analyzes audio received from each of the plurality of conference bridge ports to determine which conference bridge ports are providing audio that includes characteristics meeting at least one criterion. The processor applies a correction to the audio from each of the conference bridge ports that includes the characteristics matching the at least one criterion prior to the audio being shared with the other conference bridge ports of the plurality.

Embodiments provide a trunk dispatch system that includes a plurality of trunk dispatch wireless ports through which audio is delivered to and received from trunk dispatch participants. The audio from each trunk dispatch wireless port is prioritized and shared according to priority with the other trunk dispatch wireless ports of the plurality. A trunk dispatch processor is in communication with the plurality of trunk dispatch wireless ports and analyzes audio received from each of the plurality of trunk dispatch wireless ports to determine which trunk dispatch wireless ports are providing audio that includes characteristics meeting at least one criterion. The processor applies a correction to the audio from each of the trunk dispatch wireless ports that includes the characteristics matching the at least one criterion prior to the audio being shared with the other trunk dispatch wireless ports of the plurality.

Embodiments provide a computer readable medium that contains instructions that perform acts that include continually monitoring a plurality of ports of a multi-participant audio system, wherein each port of the plurality is utilized by at least one participant. The acts further include analyzing the audio from each port to determine whether the audio from the ports matches at least one criterion. When the audio from one of the ports matches the at least one criterion, then the acts further include applying a correction to the audio prior to distribution of the audio within the multi-participant audio system.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Embodiments provide for audio processing for multi-participant systems such as teleconference and videoconference bridges and trunk dispatch systems to control the amount of unwanted audio being introduced into the multi-participant discussion. Unwanted audio is detected based on pre-defined characteristics and then a correction is applied to decrease the significance of the unwanted audio.

Figure 1:
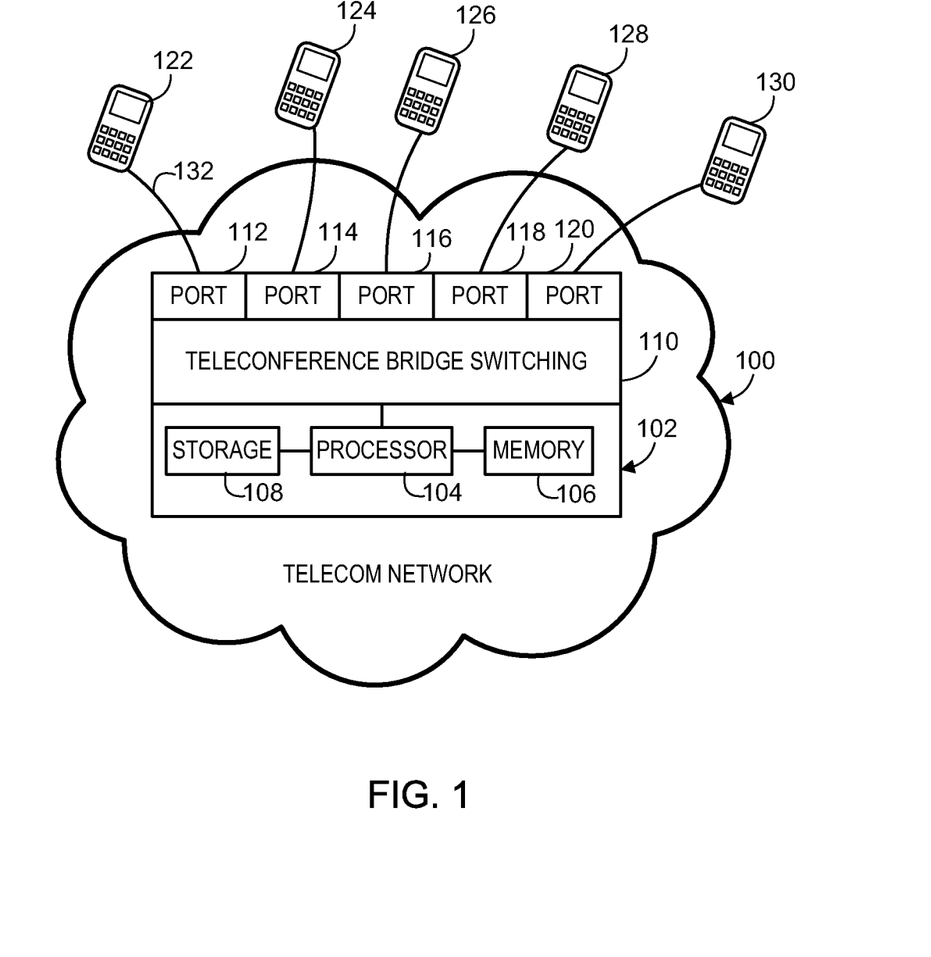
FIG. 1 shows an example of a conference bridge that provides audio processing according to various embodiments.

FIG. 1 shows a conference bridge environment such as may be used for teleconferencing and/or video conferencing. As shown in FIG. 1, a conference bridge 102 is located within a telecommunications network 100, such as the public switched telephone network (PSTN), a private telecommunications network, a voice over Internet Protocol network, or combinations thereof. The conference bridge 102 provides a conference service whereby multiple participants may dial in or otherwise connect to the conference bridge 102 through a series of communication ports. For example, participants use telephones 122, 124, 126, 128, and 130 to connect to respective communications ports 112, 114, 116, 118, and 120.

Each participant connects through a PSTN or other telecommunications connection 132. This connection 132 may be a wired or wireless connection to the telecommunications network 100. As the participant dials into the conference bridge 102, the telecommunications network 100 switches the connection 132 to the conference bridge 102 which then assigns each incoming call to an available port, such as the ports 112, 114, 116, 118, 120.

The connections 132 to each of the participants are bridged together via conference bridge switching circuitry 110 that bridges the communications ports 112, 114, 116, 118, 120 that correspond to a given conference. The conference bridge 102 may also employ a processor 104, memory 106, and storage 108 to further implement the conference and to provide audio processing according to various embodiments. For instance, the processor 104 may provide a voice menu to incoming callers to allow them to enter a conference code, passcode, and the like and to direct the conference bridge switching circuitry 110 to connect the port 112 of the incoming caller to the appropriate set of other ports 114, 116, 118, 120 for the conference code that has been received.

Upon bridging the ports 112, 114, 116, 118, 120 together to provide the conference service, the processor 104 may also provide additional functions during the conference. For instance, the processor 104 may provide information and controls to an administrator of the conference through a data connection to a personal computer in use by the administrator. The administrator may utilize the controls to mute or disconnect participants if desired. The processor 104 may additionally provide such controls to individual participants such as to activate audio processing for audio being introduced at their own location or at the location of another participant. The processor 104 may also employ audio processing to alleviate audio issues without requiring intervention by the administrator or participants. The processor 104 may sample the audio, analyze the sample, and then apply audio corrections such as muting, noise cancellation, and/or time-shifting of audio being received from a given communication port, such as one of the ports 112, 114, 116, 118, 120.

The processor 104 may be of various types. For example, the processor 104 may be a general purpose programmable processor, a dedicated purpose processor, hard-wired digital logic, or various combinations thereof. The memory device 106 may store programming and other data used by the processor 104 when implementing logical operations such as those discussed below in relation to FIGS. 3 and 4. The storage device 108 may also store programming and other data as well as storing recordings from audio ports such as audio recordings used to implement time-shifting which is discussed in more detail below. The memory 106 and/or storage device 108 may also store reference audio patterns that may be used to compare to audio samples when determining whether corrections are necessary, where the audio patterns provide one or more criteria to consider.

The processor 104, memory device 106, and/or storage device 108 are examples of computer readable media which store instructions that when performed implement various logical operations. Such computer readable media may include various storage media including electronic, magnetic, and optical storage. Computer readable media may also include communications media, such as wired and wireless connections used to transfer the instructions or send and receive other data messages.

Figure 2:
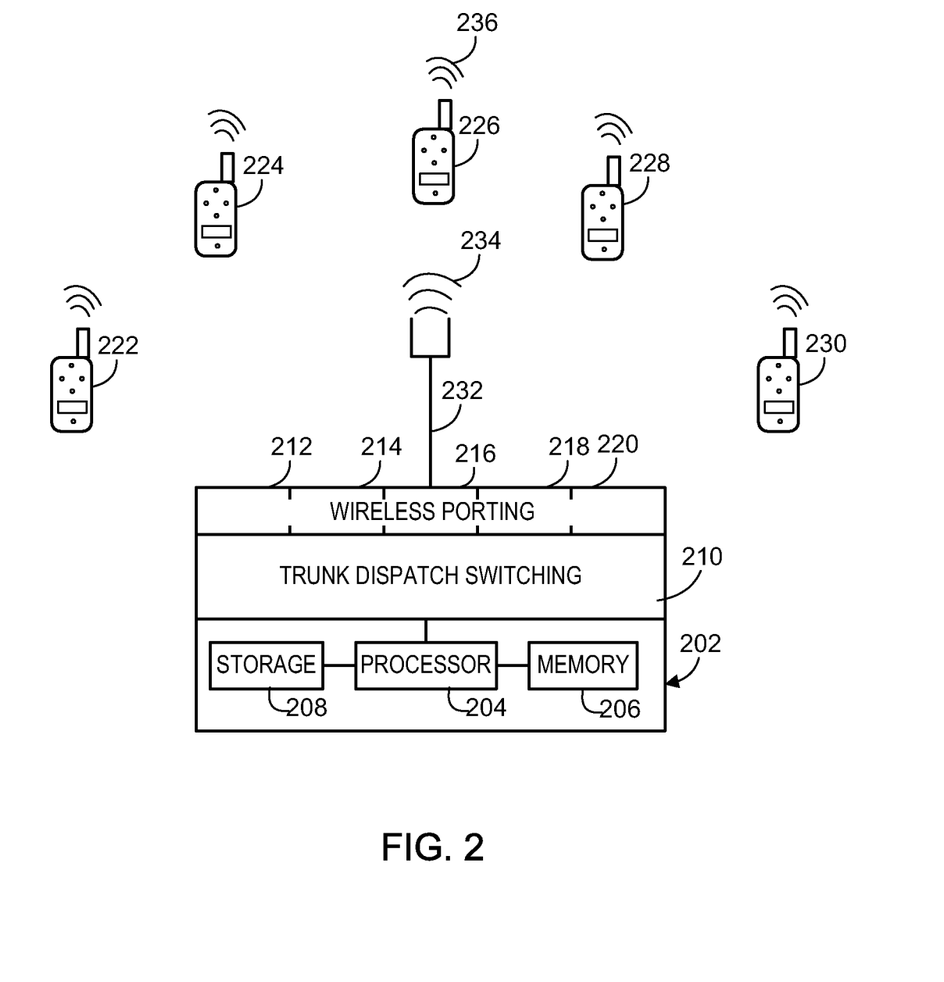
FIG. 2 shows an example of a dispatch trunk that provides audio processing according to various embodiments.

FIG. 2 shows another example of a multi-participant audio system. This particular example is a trunk dispatch system 202 that communicates by exchanging wireless signals 234 with a plurality of two-way dispatch radios 222, 224, 226, 228, 230 via an antenna 232. The trunk dispatch system 202 provides wireless porting by directing communications from a given dispatch radio, such as one of the radios 222, 224, 226, 228 230, to a given wireless port 212, 214, 216, 218, 220. The wireless ports 212, 214, 216, 218, 220 are then bridged together via trunk dispatch switching circuitry 210. The dispatch radios 222, 224, 226, 228, 230 may employ a push-to-talk mechanism whereby the audio of the trunk is continuously output by the dispatch radios 222, 224, 226, 228, 230 while the dispatch radios 222, 224, 226, 228, 230 attempt to interject audio onto the trunk upon the user pressing a talk button.

A processor 204 may be present to control the interconnection of the wireless porting 212, 214, 216, 218, 220 to provide bridging of the ports 212, 214, 216, 218, 220 and/or to provide additional audio processing. For example, the processor 204 may bridge those wireless ports 212, 214, 216, 218, 220 that correspond to a particular channel, particular organization, and so forth. Furthermore, the processor 204 may implement a priority system whereby a single dispatch radio, such as one of the radios 222, 224, 226, 228, 230, may have priority over others at any given point so that the trunked dispatch radios 222, 224, 226, 228, 230 receive the audio provided from the dispatch radio 222, 224, 226, 228, 230 having priority at that moment. For example, a first-to-talk priority system may be implemented, or priority may be assigned to the dispatch radios 222, 224, 226, 228, 230.

The radios 222, 224, 226, 228, 230 may operate on a shared frequency, or a plurality of shared frequencies. The channels may be assigned for various uses, such as one channel for tactical situation communications and another channel for medical control communications. The system may utilize analog communications, digital communications, or a combination of both between the dispatch radios 222, 224, 226, 228, and 230 and the ports 212, 214, 216, 218, and 220. Furthermore, the radios 222, 224, 226, 228, 230 may each be tagged with an identifier that is broadcast back to the corresponding port 212, 214, 216, 218, and 220 so that the processor 204 may recognize which radio is associated to which port for purposes of panic alerting, audio processing, and the like.

The processor 204 may provide additional audio processing. Similar to the processor 104 of FIG. 1, the processor 204 may also sample the audio from a given wireless port, such as one of the ports 212, 214, 216, 218 220, analyze the sample, and then apply an appropriate correction to the audio. The processor 204 may also provide muting, noise cancellation, and/or time-shifting to audio from a given wireless port, such as one of the ports 212, 214, 216, 218, 220.

The processor 204 may also be of various types like that of the processor 104. A memory device 206 may store programming and other data used by the processor 204 when implementing logical operations such as those discussed below in relation to FIGS. 3 and 4. A storage device 208 may also store programming and other data as well as storing recordings from audio ports such as recording used to implement time-shifting which is discussed in more detail below. The memory device 206 and/or storage device 208 may store audio reference patterns used to determine whether to apply a correction. The processor 204, memory device 206, and/or storage device 208 are also examples of computer readable media which store instructions that when performed implement various logical operations.

Figure 3:
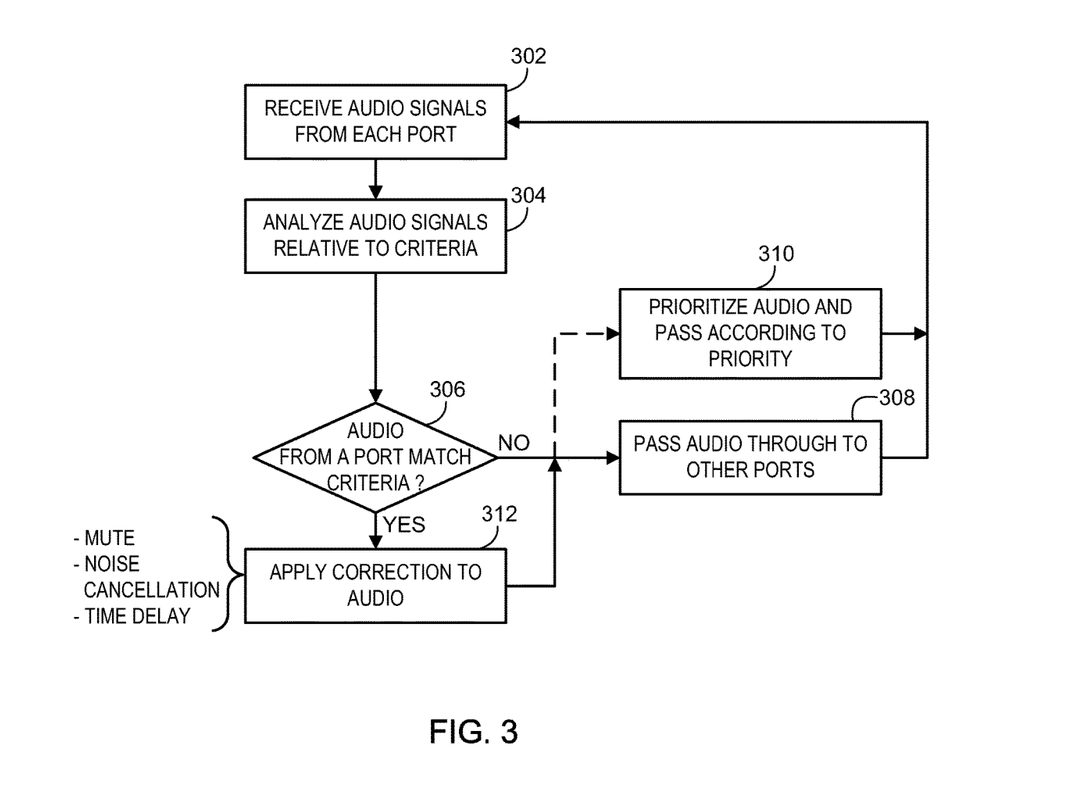
FIG. 3 shows one example of logical operations that may be performed by a multi-participant system to provide audio processing according to various embodiments.

FIG. 3 shows an example of logical operations that may be performed by the processor 104, 204 to provide audio processing that corrects detected audio issues without further intervention by an administrator or participant. Initially, the processor 104, 204 receives the incoming audio signals from each communication port 112, 114, 116, 118, 120; 212, 214, 216, 218, 220 at a signal operation 302. The processor 104, 204 then analyzes a sample of the received audio signals from each of the communication ports 112, 114, 116, 118, 120; 212, 214, 216, 218, 220 at an analysis operation 304. The processor 104, 204 may measure the sample for various characteristics and then compare those measured characteristics against pre-defined criteria where the pre-defined criteria may be expressed as deviations from a reference audio pattern. The criteria may be allowable ranges, single thresholds, and the like.

At query operation 306, the processor 104, 204 detects whether any of the measured characteristics of the audio signal matches one or more of the pre-defined criteria. If not, then according to various embodiments the audio signal that has been analyzed is further handled in a conventional manner. For example, in the conference bridge 102, the audio may be passed on to the other communication ports 112, 114, 116, 118, 120 of the conference bridge 102 at an audio operation 308. As another example such as for the trunk dispatch system 202, the audio may first be prioritized relative to other audio signals that have been received and then passed onto the other communication ports 212, 214, 216, 218, 220 in accordance with the priority at an audio operation 310. The highest priority audio may be passed on while the lowest may be discarded.

If the processor 104, 204 detects that the measured characteristics of the audio signal match one or more of the criteria, then the processor 104, 204 applies a suitable correction to the audio signal being received at a correction operation 312. For example, the processor 104, 204 may mute audio from the port 112, 114, 116, 118, 120; 212, 214, 216, 218, 220 for a period of time or continuously until the audio from the port no longer matches the criteria of interest. Muting the port 112, 114, 116, 118, 120; 212, 214, 216, 218, 220 may address the audio issues not otherwise addressed by a noise cancellation technique or time shifting. For example, if noise remains present after an attempt at filtering, then muting may be applied as the suitable correction. As another example, if audio issues other than noise are present such as background conversations, then the processor 104, 204 may select muting as the most appropriate correction.

As another example, the processor 104, 204 may apply a noise cancellation to the audio from the port 112, 114, 116, 118, 120; 212, 214, 216, 218, 220. Various factors may contribute to noise being introduced by a given port, such as one of the ports 112, 114, 116, 118, 120; 212, 214, 216, 218, 220. For example, a poor connection may introduce noise. Environmental conditions where the participant is located may introduce noise. The noise cancellation may apply attenuation filters, out-of-phase signal combinations, and the like.

As yet another example, the processor 104, 204 may apply a time delay by recording the audio to a storage device, such as the storage device 108, 208, and then playing the audio back from storage to produce a time shift. For example, it may be detected from the concurrent analysis of audio samples from the multiple ports 112, 114, 116, 118, 120; 212, 214, 216, 218, 220 that participants at the multiple ports are talking simultaneously. In that case, the processor 104, 204 may mute one of the ports 112, 114, 116, 118, 120; 212, 214, 216, 218, 220 producing the simultaneous input, record the audio from that port while allowing the audio from the competing port to pass through, and then play back the recorded audio immediately upon detecting a break in the audio from the competing port. In that manner, the likelihood that other participants can better comprehend both speakers may be increased.

Figure 4:
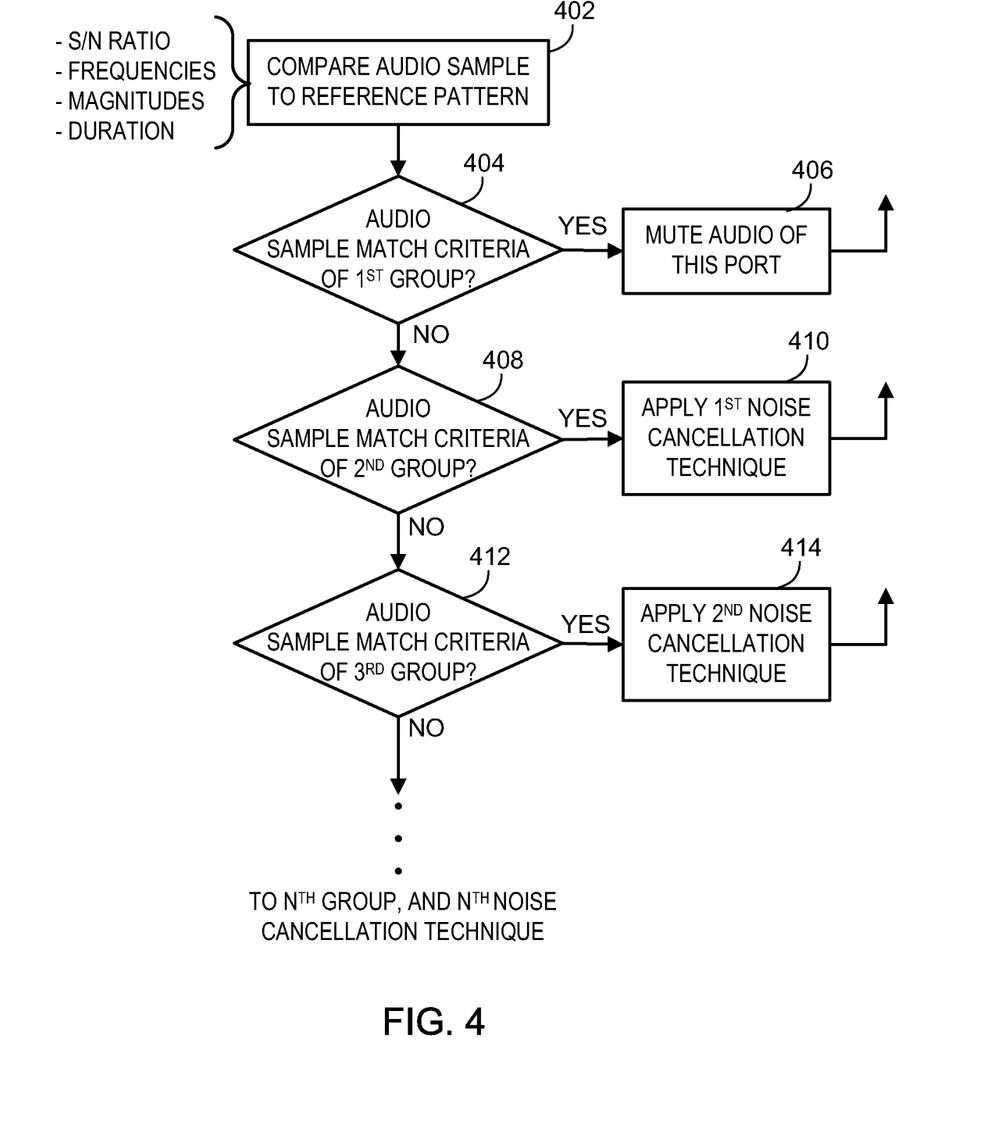
FIG. 4 shows one example of logical operations that may be performed by a multi-participant system to provide a suitable correction to audio from a communication port according to various embodiments.

FIG. 4 shows one example of a set of logical operations that may be performed according to various embodiments to apply the suitable correction as in the correction operation 312 of FIG. 3. For instance, the processor 104, 204 may be capable of applying several different forms of correction, where one form may be more suitable than another that is available to the processor 104, 204. The processor 104, 204 first determines the characteristics of the audio sample from a given communications port 112, 114, 116, 118, 120; 212, 214, 216, 218, 220 and compares them to characteristics of the reference audio pattern at a comparison operation 402.

Here the processor 104, 204 may look at characteristics such as the signal-to-noise (S/N) ratio where the signal is known to be a human voice within a defined frequency range and other audio energy is considered to be noise. A S/N ratio less than an allowable deviation from the reference pattern may indicate that there is more background noise than is acceptable such that a noise cancellation for the background noise might be the most suitable correction.

The processor 104, 204 may additionally or alternatively determine frequencies that are present, the magnitudes of the given frequencies that are present, and the durations of the audio energy at a given frequency and/or magnitude. Here, the processor 104, 204 may determine that the frequencies are within the acceptable range relative to an allowable deviation from the reference pattern such that there is a human voice that is present. However, the processor 104, 204 may further determine that the human voice has a magnitude that is too high to be acceptable, such as because a participant has a microphone sensitivity too high or is speaking in an unacceptably loud tone. This condition may indicate that a voice attenuation algorithm is a necessary correction or that muting of the port is necessary.

The processor 104, 204 may instead determine that the frequencies that are present indicate multiple speakers at a given port. If the magnitudes of one or more of the multiple speakers are less than an acceptable level while the duration persists longer than an allowable deviation from the reference pattern, then this may indicate that an ongoing background conversation is being introduced by the communication port 112, 114, 116, 118, 120; 212, 214, 216, 218, 220 under consideration. In that case, muting of the communication port 112, 114, 116, 118, 120; 212, 214, 216, 218, 220 for a period of time or until the background conversation stops may be desirable.

Upon comparing these measured characteristics to the reference audio pattern, the processor 104, 204 then detects whether the comparison indicates that the audio sample matches the criteria of a first group. For example, as discussed above, the audio sample may have frequencies, magnitudes, and durations that match a first group of criteria indicative of a background conversation. At a query operation 404, the processor 104, 204 detects that the measured characteristics match the criteria of the first group and the processor 104, 204 then mutes the corresponding communication port 112, 114, 116, 118, 120; 212, 214, 216, 218, 220 at a mute operation 406. Operational flow then proceeds to measure a subsequent audio sample.

If the audio sample does not match the first group, then the processor 104, 204 detects whether the measured characteristics of the audio sample match those criteria of a second group at a query operation 408. For example, the audio sample may have a high S/N ratio with the voice signal lying within a first frequency range while the noise having an emphasis in a second frequency range which is a match for a second group of criteria. In this case, the processor 104, 204 applies a first noise cancellation technique at a cancellation operation 410, such as a noise filter that has a low attenuation at the first frequency range corresponding to the voice and a higher attenuation at the second frequency range corresponding to the noise. Operational flow then proceeds to measure a subsequent audio sample.

If the audio sample does not match the second group, then the processor 104, 204 detects whether the measured characteristics of the audio sample match those criteria of a third group at a query operation 412. For example, the audio sample may have a high S/N ratio with a first voice signal lying within a first frequency range and a second voice signal lying within a second frequency range while the noise has an emphasis in a third frequency range which is a match for a third group of criteria. In this case, the processor 104, 204 applies a second noise cancellation technique at a cancellation operation 414, such as a noise filter that has a low attenuation at the first and second frequency ranges corresponding to the voice and a higher attenuation at the third frequency range corresponding to the noise. Operational flow then proceeds to measure a subsequent audio sample.

This process of matching measured characteristics of the audio sample to criteria of a particular group may continue to the Nth group and Nth noise cancellation technique to cover as many permutations of the measured characteristics as is desirable. A corresponding correction may then be applied as discussed above.

In determining whether the audio samples match a given reference pattern and hence the criteria of a particular group, additional factors may be considered. For example, the particular language being spoken during the conference may be a factor that dictates what reference patterns are used for comparison to detect whether unwanted audio is present and to dictate what types of correction may be employed. The language may be set by the administrator, on a conference level or at the individual participant level where participants may speak different languages.

Rather than relying on a manual setting, location detection may be performed where a default language for a given location is applied during the audio processing. In this case, the individual phones/dispatch radios and the conference bridge/dispatch trunk may employ location detection through geonavigational positioning, tower-based triangulation, and/or user designation. The phones/dispatch radios may report location through a control signal back to the conference bridge/dispatch trunk where the location of each participant associated with a corresponding port 112, 114, 116, 118, 120; 212, 214, 216, 218, 220 may be considered. As another example, calling number information from the participant may be used to determine location, such as from the area code and exchange code of the calling number.

In addition to utilizing the location data to better determine what reference patterns and corrections to be employed to detect and remove unwanted audio, a database of expected noises associated with locations may be maintained at the conference bridge/dispatch trunk. In this manner, the reference patterns and corrections to be employed may be based on expected noise from the database such that when a location for a given participant is determined, the reference patterns and corrections that most closely match the noise that is anticipated for that location may be applied to that port 112, 114, 116, 118, 120; 212, 214, 216, 218, or 220 to more effectively detect and remove unwanted audio. As the location of the participant may change during a conference, this location determination and selection of location-appropriate reference patterns and corrections may be continually updated.

As the logical operations of FIGS. 3 and 4 may be performed concurrently for each communication port 112, 114, 116, 118, 120; 212, 214, 216, 218, 220 involved in the multi-participant communication, a different correction may be applied to one communication port 112, 114, 116, 118, 120; 212, 214, 216, 218, 220 relative to another. For example, the first port 112 may have a first noise cancellation applied while the second port 114 is muted and while the third port 116 has a second noise cancellation applied. Furthermore, the available corrections may be different from one communication port 112, 114, 116, 118, 120; 212, 214, 216, 218, 220 to the next and may be dependent upon which participants are using which ports.

For example, it may be known that a first particular participant will likely need to be muted while it may be known that a second participant will likely require noise cancellation.

Thus, the processor 104, 204 may limit consideration to muting and time shifting as the corrections available for the first participant while limiting consideration to available noise cancellation techniques for the second participant. The association of a given participant to a given communication port, such as one of the ports 112, 114, 116, 118, 120; 212, 214, 216, 218, 220, in order to apply the appropriate set of corrections to that communication port 112, 114, 116, 118, 120; 212, 214, 216, 218, 220 may be established through one of various ways. For example, the passcode that is entered through a particular communication port 112, 114, 116, 118, 120; 212, 214, 216, 218, 220 may be recognized as being from a particular participant or called identification data that is received through a particular communication port 112, 114, 116, 118, 120; 212, 214, 216, 218, 220 may be recognized as being from a particular participant.

Thus, as discussed above, unwanted audio being interjected into the multi-participant conversation may be addressed. Characteristics of the audio from a communication port may be measured, a determination regarding whether a correction should be applied may be made, a suitable correction may be chosen, and then that correction may be applied to the audio prior to passing the audio to the multiple participants.

While embodiments have been particularly shown and described, it will be understood by those skilled in the art that various other changes in the form and details may be made therein without departing from the spirit and scope of the invention.

The invention claimed is:

1. A conference bridge, comprising:
a plurality of conference bridge ports through which audio is delivered to and received from conference participants, the audio from each conference bridge port being shared with the other conference bridge ports of the plurality;
a processor that is in communication with the plurality of conference bridge ports; and
a non-transitory memory storing instructions which, when executed by the processor, cause the processor to perform operations comprising:
analyzing audio received from each of the plurality of conference bridge ports to determine which conference bridge ports are providing audio that includes characteristics matching at least one criterion by comparing a frequency, magnitude or duration of a sample of audio from each conference bridge port to a reference pattern of audio to determine a deviation from the reference pattern of audio of the frequency, the magnitude or the duration;
associating a conference bridge participant among a plurality of conference bridge participants with each of the plurality of conference bridge ports;
determining a location of each of the conference bridge participants; and
applying a correction to the audio from each of the conference bridge ports that includes the characteristics matching the at least one criterion prior to the audio being shared with the other conference bridge ports of the plurality, wherein the correction being applied by the processor varies based on the conference bridge port producing the audio being corrected, based on the conference bridge participant associated with the conference bridge port producing the audio being corrected, and based on the location of the conference bridge participant associated with the conference bridge port producing the audio being corrected;
wherein the processor applies the correction by muting and recording a period of audio from a first conference bridge port when the audio from the first conference bridge port overlaps with audio from a second conference bridge port, and replaying the recording of the audio to the plurality of conference bridge ports upon detecting an end of a period of audio from the second conference bridge port.

2. The conference bridge of claim 1, wherein the processor further applies the correction by applying a noise cancellation to the audio from the conference bridge port.

3. The conference bridge of claim 1, wherein the processor further applies the correction by providing noise cancellation to audio from a second conference bridge port.

4. The conference bridge of claim 1, wherein the processor further applies the correction by muting the audio when the sample matches a first group of criteria and applies a noise cancellation when the sample matches a second group of criteria.

5. The conference bridge of claim 1, wherein the processor further applies the correction by applying a first noise cancellation technique to the audio when the sample matches a first group of criteria and applies a second noise cancellation technique when the sample matches a second group of criteria.

6. The conference bridge of claim 1, wherein the non-transitory memory further stores instructions which, when executed by the processor, cause the processor to determine a language associated with the location of the at least one the conference bridge participants, wherein the correction applied to the audio from the conference bridge ports depends upon the language associated with the location of the conference bridge participant.

7. The conference bridge of claim 1, wherein associating a conference bridge participant with a conference bridge port comprises recognizing a passcode that is entered through the conference bridge port as being associated with the conference bridge participant.

8. The conference bridge of claim 1, wherein as the location of a conference bridge participant changes, the correction being applied by the processor to the audio from the conference bridge port associated with the conference bridge participant is updated.

9. A trunk dispatch system, comprising:
a plurality of trunk dispatch wireless ports through which audio is delivered to and received from a plurality of trunk dispatch participants, the audio from each trunk dispatch wireless port being prioritized and shared according to priority with the other trunk dispatch wireless ports of the plurality;
a trunk dispatch processor that is in communication with the plurality of trunk dispatch wireless ports; and a non-transitory memory storing instructions which, when executed by the trunk dispatch processor cause the trunk dispatch processor to perform operations comprising:
  analyzing audio received from each of the plurality of trunk dispatch wireless ports to determine which trunk dispatch wireless ports are providing audio that includes characteristics matching at least one criterion by comparing a frequency, magnitude or duration of a sample of audio from each conference bridge port to a reference pattern of audio to determine a deviation from the reference pattern of audio of the frequency, the magnitude or the duration;
  associating a trunk dispatch participant among the plurality of trunk dispatch participants with each of the plurality of trunk dispatch wireless ports;
  determining a location of each of the trunk dispatch participants; and
  applying a correction to the audio from each of the trunk dispatch wireless ports that includes the characteristics matching the at least one criterion prior to the audio being shared with the other trunk dispatch wireless ports of the plurality, wherein the correction being applied by the trunk dispatch processor varies based on the trunk dispatch wireless port producing the audio being corrected, based on the trunk dispatch participant associated with the trunk dispatch wireless port producing the audio being corrected, and based on the location of the trunk dispatch participant associated with the trunk dispatch wireless port producing the audio being corrected;
  wherein the trunk dispatch processor applies the correction by muting and recording a period of audio from a first trunk dispatch wireless port when the audio from the first trunk dispatch wireless port overlaps with audio from a second trunk dispatch wireless port, and replaying the recording of the audio to the plurality of trunk dispatch wireless ports upon detecting an end to a period of audio from the second trunk dispatch wireless port.

10. The trunk dispatch system of claim 9, wherein the processor further applies the correction by applying a noise cancellation to the audio from the trunk dispatch wireless port.

11. The trunk dispatch system of claim 9, wherein the processor further applies the correction by providing noise cancellation to audio from a second trunk dispatch wireless port.

12. The trunk dispatch system of claim 9, wherein the processor further applies the correction by muting the audio when the sample matches a first group of criteria and applies a noise cancellation when the sample matches a second group of criteria.

13. The trunk dispatch system of claim 9, wherein the processor further applies the correction by applying a first noise cancellation technique to the audio when the sample matches a first group of criteria and applies a second noise cancellation technique when the sample matches a second group of criteria.

14. A non-transitory computer readable medium containing instructions that, when executed by a processor, cause the processor to perform operations comprising:
  continually monitoring a plurality of ports of a multi-participant audio system, wherein each port of the plurality of ports is associated with a participant among a plurality of participants;
  analyzing the audio from each port to determine whether the audio from the ports matches at least one criterion by comparing a frequency, magnitude or duration of a sample of audio from each conference bridge port to a reference pattern of audio to determine a deviation from the reference pattern of audio of the frequency, the magnitude or the duration;
  determining a location of each of the participants; and
  when the audio from one of the ports matches the at least one criterion, then applying a correction to the audio prior to distribution of the audio within the multi-participant audio system, wherein the correction applied varies based on the port producing the audio being corrected, based on the participant associated with the port producing the audio being corrected, and based on the location of the participant associated with the port producing the audio being corrected and wherein the correction includes muting and recording a period of audio from a first port of the plurality of ports when the audio from the first port overlaps with audio from a second port of the plurality of ports, and replaying the recording of the audio to the plurality of ports upon detecting an end of a period of audio from the second port.

15. The non-transitory computer readable medium of claim 14, wherein the correction includes applying a noise cancellation to the audio from the first port.

16. The non-transitory computer readable medium of claim 14, wherein the correction includes providing noise cancellation to audio from a second port.

17. The non-transitory computer readable medium of claim 14, wherein the correction includes muting the audio when the sample matches a first group of criteria and applies a noise cancellation when the sample matches a second group of criteria.

18. The non-transitory computer readable medium of claim 14, wherein the correction includes applying a first noise cancellation technique to the audio when the sample matches a first group of criteria and applies a second noise cancellation technique when the sample matches a second group of criteria.

19. The non-transitory computer readable medium of claim 14, wherein the operations further include:
  determining a language associated with the location of the participant associated with the port producing the audio being corrected, wherein the correction applied to the audio from the plurality of ports depends upon the language associated with the location of the participant associated with the port producing the audio being corrected.

20. The non-transitory computer readable medium of claim 14, wherein the participant is associated with the port producing the audio being corrected by recognizing a passcode that is entered through the port as being associated with the participant.

* * * * *